United States Patent [19]
Murphy

[11] 3,891,313
[45] June 24, 1975

[54] STEREO ACCESSORY FOR PROJECTORS
[76] Inventor: Gregory I. Murphy, 4042 Phoenix St., Concord, Calif. 94521
[22] Filed: Sept. 14, 1973
[21] Appl. No.: 397,226

Related U.S. Application Data
[63] Continuation-in-part of Ser. No. 375,539, July 2, 1973, abandoned.

[52] U.S. Cl. .................. 353/8; 350/132; 352/60
[51] Int. Cl.² ................ G03B 21/00; G03B 35/18; G02B 27/26
[58] Field of Search .............. 353/8; 350/132, 143; 352/60

[56] References Cited
UNITED STATES PATENTS

| | | | |
|---|---|---|---|
| 2,241,041 | 5/1941 | Sauer | 353/8 |
| 2,329,294 | 9/1943 | Ramsdell | 353/8 |
| 2,360,322 | 10/1944 | Harrison | 352/60 |
| 2,612,818 | 10/1952 | Jackson | 353/8 |
| 3,232,166 | 2/1966 | Matagne | 353/8 |

Primary Examiner—Richard E. Aegerter
Assistant Examiner—Steven L. Stephan
Attorney, Agent, or Firm—Edwin H. Baker

[57] ABSTRACT

Accessory for conventional projectors for projecting of stereo pair slides or motion pictures from a split-image transparency comprising a housing having front and back sides substantially parallel to each other. The back wall is provided with two adjacent windows made of polarizing material having polarizing axes set at 90° to one another. A system of reflectors is provided inside the housing to divide light projected through the back windows and direct it through a pair of windows (preferably made of polarizing material) in the front wall of the housing as it is projected to the viewing screen.

1 Claim, 6 Drawing Figures

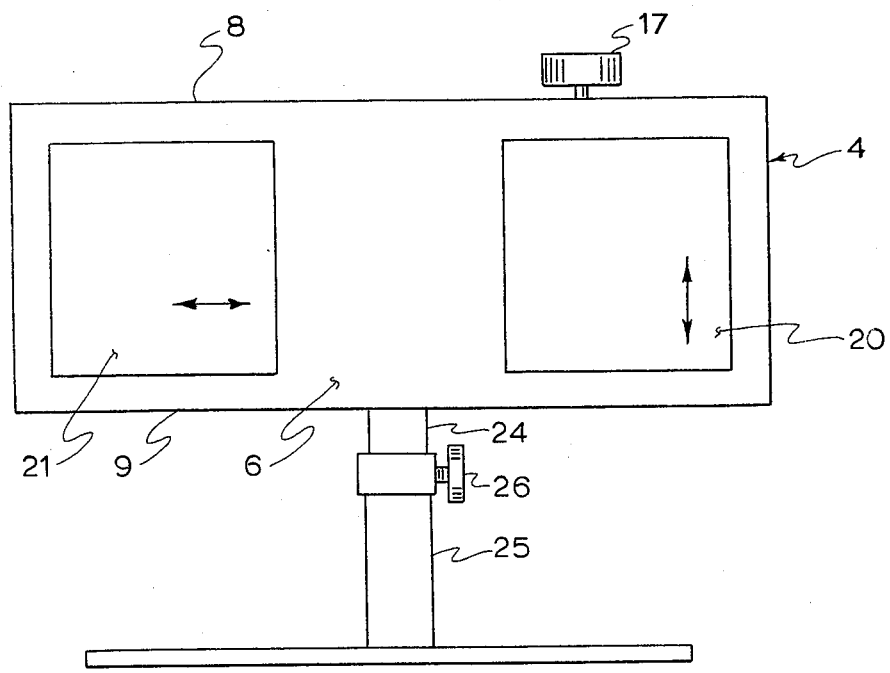
FIG. I
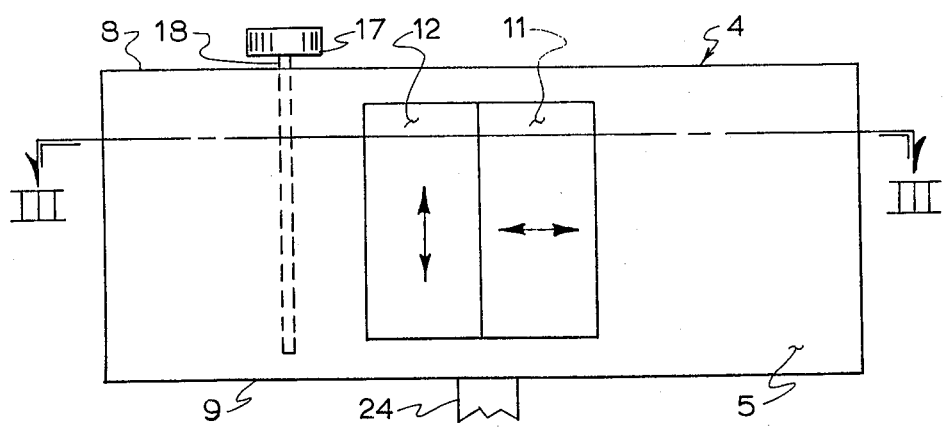
FIG. II
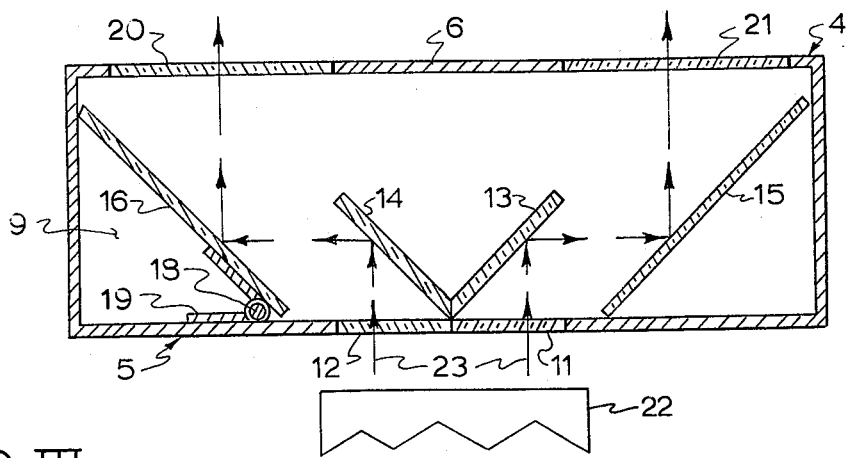
FIG. III

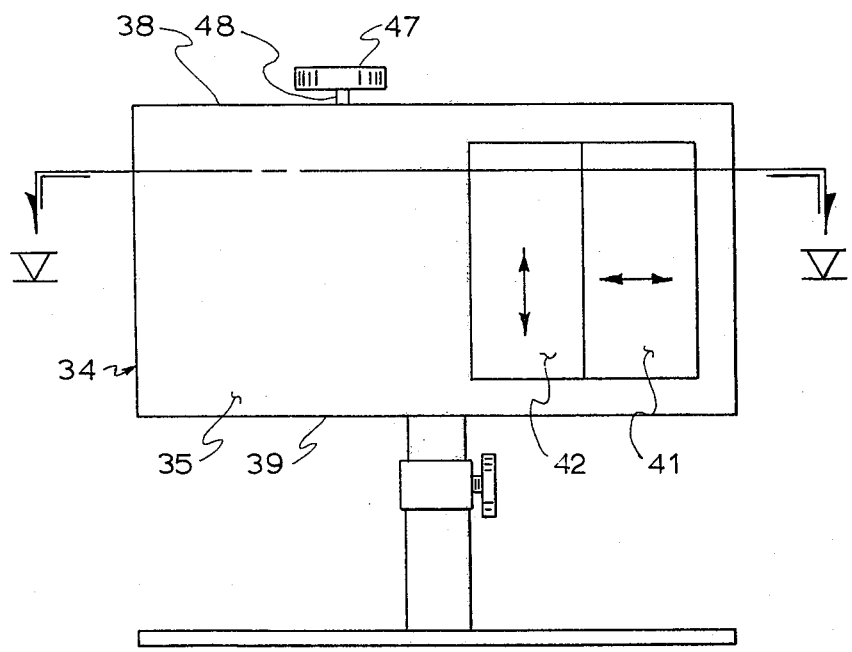
FIG. IV
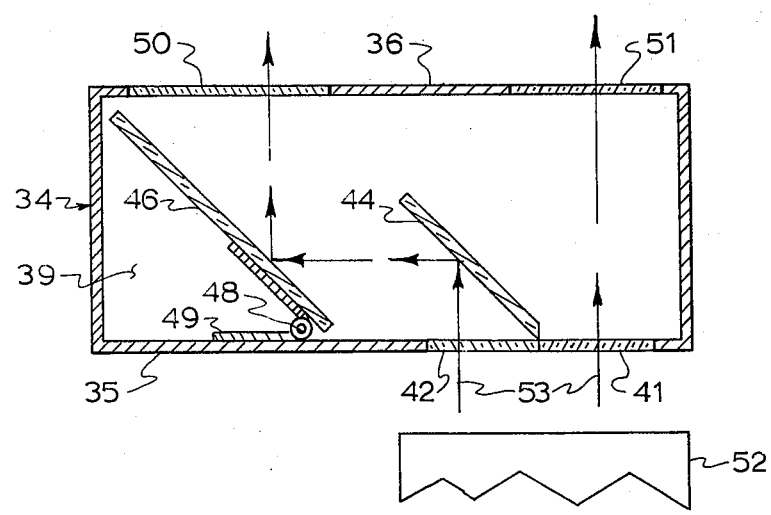
FIG. V

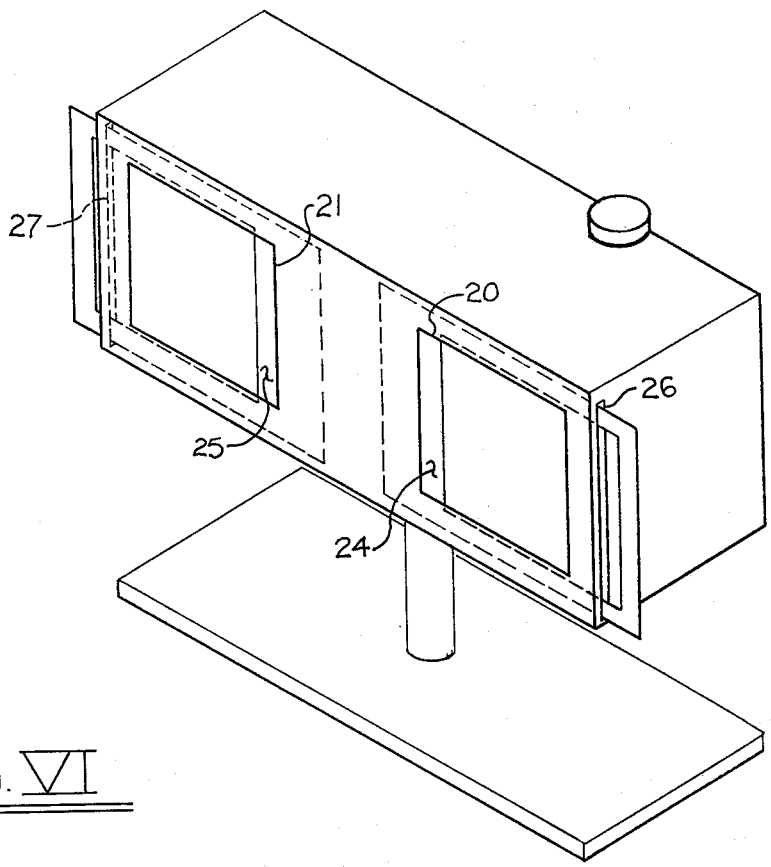
FIG. VI

STEREO ACCESSORY FOR PROJECTORS

This application is a continuation-in-part of parent application serial no. 375,539, filed July 2, 1973 now abandoned.

This invention relates to a novel and useful accessory for conventional projectors for the projecting of stereo pair slides or motion pictures from a split-image film.

Several devices have been made for the purpose of projecting stereo transparencies. Among these devices are various projectors that only accept stereoscopically related slides mounted in a particular type of slide mount. Such projectors utilize a double lens system and are relatively expensive to purchase. Similarly, a device for projecting stereo motion pictures has been made, but it is also limited to a particular film size and is relatively expensive to purchase.

Another prior art device used to project split-image stereo slides or motion pictures utilizes a pair of reflectors on a stand to reflect the projected images to the screen and overlap them on the screen. However, in using such a device the projector must be pointed at a 90° angle away from the screen and the device reflects the images to the screen rendering them reversed on the screen. Such a device also causes surplus images to appear on the screen, that is images side-by-side or strings of images which are annoying when viewed.

Still another prior art device avoids right angle projection and successfully eliminates surplus images using a special framing arrangement. However, the framing character of such a device causes such a great light loss that an extra powerful light source must be utilized.

There are also lens replacements which are substituted for the lens of a projector which utilize prisms and polarizing elements, but these replacement lenses fit only specific projectors, are expensive to purchase and are difficult to use.

Another device comprises a set of reflectors mounted in a housing and is used to adapt a hand held type stereo viewer to a lens barrel of a projector for viewing stereo slides. However, the device is difficult to use.

The present invention provides a simple and inexpensive accessory for enabling a conventional slide or motion picture projector to be used for projecting stereoscopic pictures without the inconveniences of the heretofore mentioned devices.

The invention comprises a housing having front and back sides substantially parallel to each other. The back side is provided with two adjacent windows made of polarizing material having polarizing axes set at 90° to one another. A system of reflectors is provided inside the housing to divide light projected through the back windows and direct it through a pair of windows in the front side of the housing, preferably made of polarizing material as it is projected to the viewing screen.

The accessory apparatus can be used with most types of projectors including 35 mm slide projectors and 8 mm, Super 8 mm or 16 mm motion picture projectors.

It is an object of the present invention to provide a simple and efficient accessory that can be positioned in the light path of a conventional projector for projecting stereo slides or motion pictures made in the split-image stereo format.

It is another object to provide such an accessory which employs a housing provided with a pair of windows made of polarizing material through which the light beam from the projector is passed and utilizing an adjustable reflector system for splitting the light beam for stereoscopic projection on a viewing screen.

Still another object is to provide such accessory to be used in conjunction with a viewing person who is wearing spectacles having eye pieces made of polarizing material.

It is still another object of the present invention to provide accessory of the class described which is simple and compact in construction, economical of manufacture, efficient in operation and which can be readily used by the public for stereoscopic viewing of split-image stereo slides and motion pictures.

Other objects, features and advantages of this invention will be apparent from the following detailed description and appended claims, reference being made to the accompanying drawings forming a part of the specification wherein like reference numerals designate corresponding parts of the several view.

FIG. I is a front view of embodiment one of the stereo projection accessory of this invention.

FIG. II is a back view of the embodiment of FIG. I.

FIG. III is a top, cross-sectional view of the accessory of FIG. II taken along plane III—III.

FIG. IV is a back view of another embodiment of the accessory of this invention.

FIG. V is a top, cross-sectional view of the accessory of FIG. IV taken along plane V—V.

FIG. VI is a perspective view of embodiment one of the stereo projection accessory having light shields.

Referring to the drawings and in particular to FIG. I, II, and III, an illustrative embodiment of the accessory of this invention comprises a rectangular shaped housing 4, preferably made of metal or plastic, having a back wall 5 and front wall 6 which are substantially parallel to each other. Windows 11 and 12 are adjacently positioned near the imaginary vertical center line of back wall 5. Windows 11 and 12 are preferably rectangularly shaped and made of light polarizing material and are positioned with their polarizing axes perpendicular to each other as illustrated by the arrows on windows 11 and 12, FIG. II. It is preferred that the polarizing axis of window 11 be oriented horizontally and the polarizing axis of window 12 be oriented vertically.

In the left portion of the accessory, reflector 14 is mounted inside housing 4 directly in front of window 12 at an angle of approximately 45° to the back wall of the housing and substantially perpendicular to the top wall 8 and bottom wall 9, walls of housing 4. Reflector 16 is hingedly mounted inside housing 4, generally parallel to reflector 14. Reflector 16 is pivoted at 18 by manually turning knob 17 which is attached to rod 18, which is part of hinge 19 which connects reflector 16 to the backwall 5. Reflector 16 is adjustable to superimpose the two stereo related images on the viewing screen.

Reflector 16 is positioned from reflector 14 at a distance sufficient to permit all light passing through window 12 and reflected by reflector 14 to be in turn reflected by reflector 16 through window 20 without again striking reflector 14. Polarizing window 20 is made of polarizing material and is so positioned on the front wall 6 of housing 4 that light reflected by reflector 16 can pass therethrough. The polarizing axis of window 20 is parallel with the polarizing axis of window 12 as illustrated by the arrows on windows 20 and 12. FIG. I and II.

In the right portion of the accessory reflector 13 is mounted inside of housing 4 adjacent reflector 14 at approximately a right angle to reflector 14, directly in front of window 11 and at an angle of approximately 45° to the back wall 5 and substantially perpendicular to the top and bottom walls of the accessory. Reflector 15 is mounted inside of housing 4 substantially parallel to reflector 13. Reflector 15 is positioned from reflector 13 at a distance sufficient to permit all light projected through window 11 and reflected by reflector 13 to be in turn reflected by reflector 15 through window 21 without restriking reflector 13. Polarizing window 21 is made of polarizing material and is so positioned on front wall 6 of housing 4 that the light reflected from reflector 15 may pass therethrough. The polarizing axis of window 21 is parallel with the polarizing axis of window 11.

Polarizing windows 20 and 21 are located apart from each other on the front wall and act to further polarize light projected through back windows 12 and 11 and filter excess images from the projected picture. However, the windows may be made from clear glass or plastic, or be openings.

The housing 4 may be mounted on a stand 25 which is adjustable for height by loosening thumbscrew 26 and moving rod 24 within tube 25 and resetting thumbscrew 26 at the position desired to accomodate the height of different projector lenses.

As seen in FIG. III, the light beam 23 from the projector lens 22 is projected through windows 11 and 12 where it is polarized and divided, and passes to reflector 13 and 14. The light received by reflector 13 is reflected to reflector 15 where it is reflected through window 21 onto the viewing screen. The light reflected by reflector 14 is reflected to adjustable reflector 16 where it is reflected through window 20 to the viewing screen.

In operation of the embodiment of FIGS. I, II and III, a conventional slide or motion picture projector is positioned in the normal manner on a table or other customary surface. Slides or movies made in the split-image format are used. Next, the accessory is positioned directly in front of the projector lens at a distance of 0 to 12 inches and adjusted for height so that the light beam from the projector passes through windows 11 and 12 to the screen. The images are then aligned on the viewing screen by manually adjusting reflector 16 by turning knob 17 until the two images are superimposed on the screen. The image is then viewed with polarized spectacles and the image is seen in stereo form.

Again, referring to the drawings and in particular to FIGS. IV and V, a second illustrative embodiment of this invention comprises a rectangular shaped housing 34, having a back wall 35 and a front wall 36 which are substantially parallel to each other. Windows 41 and 42 are adjacent to each other, are located toward one side of back wall 35, are made of polarizing material and are positioned with their polarizing axes perpendicular to each other as illustrated by the arrows on windows 41 and 42, FIG. IV. It is preferred that the polarizing axis of window 41 be oriented horizontally and the polarizing axis of window 42 be oriented vertically.

In the left portion of the accessory, reflector 44 is mounted inside of housing 34 directly in front of window 42 at an angle of approximately 45° to the back wall 35 of the housing and substantially perpendicular to the top wall 38 and bottom wall 39 of the accessory.

Reflector 46 is hingedly mounted to the inside of the back wall 35 of the housing 34 and generally parallel to reflector 44. Reflector 46 is adjustable by manually turning knob 47 which is attached to rod 48, which is part of hinge 49 which connects reflector 46 to back wall 35. Reflector 46 is adjustable for superimposing the two stereo related images on the viewing screen.

Reflector 46 is positioned from reflector 44 at a distance sufficient to permit all light projected through window 42 and reflected by reflector 44 to be in turn reflected by reflector 46 through window 50 without again striking reflector 44. Polarizing window 50 is made of polarizing material and is so positioned on the front wall 36 of housing 4 that light reflected by reflector 46 may pass therethrough. The polarizing axis of window 50 is parallel with the polarizing axis of window 42.

In the right position of the accessory polarizing window 51 is positioned on front wall 36 of housing 34 directly in front of window 41 so that light projected through window 41 will pass directly through window 51 to the viewing screen. The polarizing axis of window 51 is parallel to the polarizing axis of window 41.

Polarizing windows 50 and 51 are located apart from each other on the front wall of the housing and act to further polarize and filter light projected through windows 42 and 41. However, the windows may be made from clear glass or plastic, or be openings.

As seen in FIG. V, the light beam 53 from the projector lens 52 is projected through windows 41 and 42, where it is polarized and divided. Half of the light is reflected by reflector 44 to adjustable reflector 46 where it is reflected through window 50 onto the viewing screen. The light projected through window 41 passes directly through window 51 to the viewing screen. Alignment of the images on the screen is made by adjusting movable reflector 46 to superimpose the image reflected by reflector 46 over the image projected onto the screen through windows 41 and 51.

Referring to FIGS. I–III of the drawings, as the picture is projected through the back two windows 11 and 12 of the accessory to the viewing screen a part of the right hand picture may be projected through the left rear window 12 and a part of the left hand picture may be projected through the right window 11 causing an excess partial image to appear at one or both sides of the main projected picture. Such may be annoying when viewing the stereo slides and movies.

Referring to FIG. VI, light shields 24 and 25 are provided to eliminate the problem discussed above. These shields are essentially slideable wall segments that act to extend outwardly the inside edge of the front windows 20 and 21. These shields are adjusted outward in slots 26 and 27 toward their respective side wall of the accessory to the point where the partial image is shielded out on the viewing screen, in turn, framing the main picture.

The shield out a partial image at the left side of the main picture, the right shield 21 is adjusted outwardly in slot 21 until the left partial image is blacked out. To shield out a partial image at the right of the main picture, the left light shield 20 is adjusted outwardly in slot 26 until the right partial image is blacked out.

As previously stated, the stereoscopic images projected through the accessory are viewed through a pair of spectacles which have eye pieces made from polarizing material. The polarizing axes of the right and left eye of the spectacles should be oriented parallel with the axes of back windows 11 and 12 respectively.

As an alternative method of minimizing excess partial image, an additional pair of polarizing windows with axes oriented to correspond with windows 11 and 12 may be positioned at the film gate of the projector to polarize the image before it leaves the projector, allowing the accessory to filter excess images. Since a projector inverts an image that it projects, the windows should cover the film gate and be inverted as a pair in relation to the windows 11 and 12 to compensate for the inversion of the image made by the projector.

In summary of the orientation of the polarizing elements, the left half of the projection and viewing system, that is windows 12, 20 and the right hand window in the projector as well as the left eye piece of the spectacles must have polarizing axes parallel to one another. Likewise, the right half of the projection and viewing system, that is, windows 11, 21 and the left hand window in the projector as well as the right eye piece of the spectacles must have polarizing axes parallel to one another. The polarizing axis of the left half of the system is orientated perpendicular to the polarizing axis of the right half of the system. A preferred orientation of the axes is that the left half of the system be oriented vertically, and the right half be oriented horizontally, as illustrated in FIGS. II and IV.

The reflectors of this invention can be made of any surface reflecting material such as polished stainless steel or front silvered glass. The most preferred material for the reflectors is front surface mirror.

The polarizing material used in the accessory may be of polarized glass or plastic film.

A viewing screen having a lenticular or metallic surface such as an aluminum painted surface should be used to maintain the polarized quality of the light.

Light shields identical to light shields 24 and 25 can also be provided in slots identical to slots 26 and 27 for windows 50 and 51 of the embodiment shown in FIG. V. The operation correspondingly is the same to shield out undesired partial images.

It is to be understood that the foregoing description is merely illustrative of the preferred embodiments of the invention and that the scope of the invention is not to be limited thereto, but is to be determined by the scope of the appended claims.

I claim:

1. A stereo accessory for a projector comprising (a) a housing having a front and a rear wall in spaced relationship; (b) polarizing means comprising two windows made of polarizing material and having axes oriented perpendicular to each and positioned adjacent to one another in the rear wall of said housing for dividing a light beam from the projector into separate parts having polarization axes oriented perpendicular to each other as it passes into said housing (c) separating means inside said housing for separating said divided and oriented light into its own separate beams, said separating means comprising a set of two reflectors mounted at approximately a 45° angle to the back wall of said housing with the backmost edge of said reflectors forming approximately a 90° angle vertically adjacent to each other at the adjacent line of said back windows, said reflectors being located to receive the light rays projected into said housing through said back windows and reflect said light rays, (d) superimposing means inside said housing for superimposing said separated beams on a viewing screen, said superimposing means being located to receive the light reflected by said separating means and comprising two reflectors mounted inside said housing one of which is adjustably mounted and the other is fixadly mounted; (e) adjusting means for adjusting the adjustably mounted reflector manually from outside of said housing; (f) shielding means for eliminating an undesired excess image which appears on the side of the desired projected picture; comprising a pair of slideable wall segments that act to extend outwardly the inside edge of said front windows and being positioned in slots located in the front wall of said housing; (g) a pair of windows located in said front wall of said housing through which said separated light beams can pass out of said housing.

* * * * *